V. KUBELKA.
ANTISKID DEVICE.
APPLICATION FILED FEB. 12, 1921.
1,383,823.
Patented July 5, 1921.
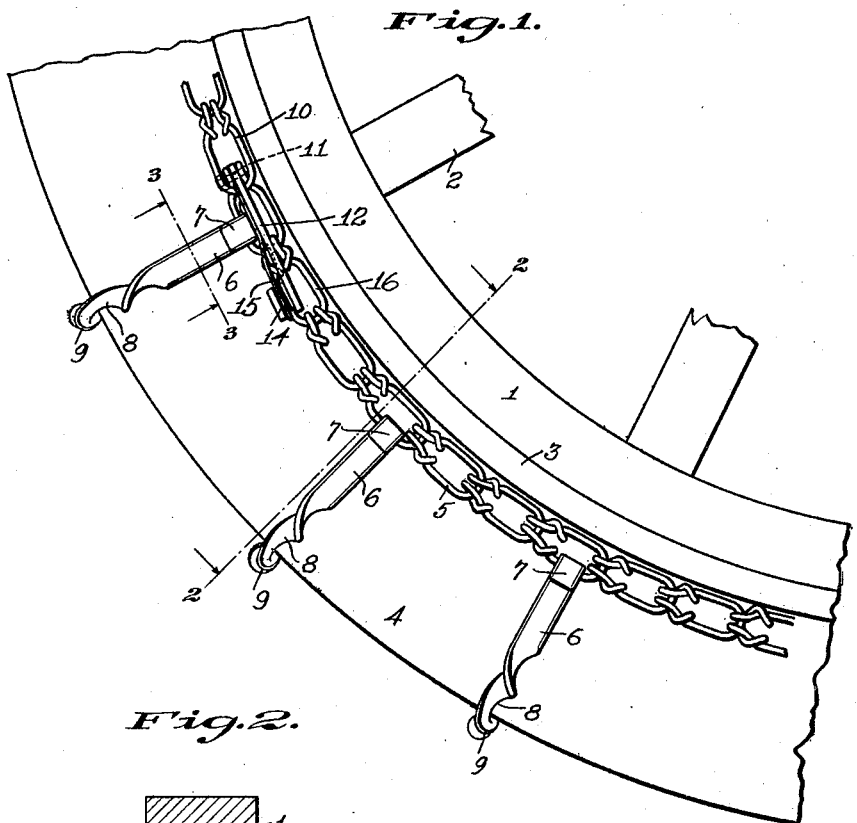
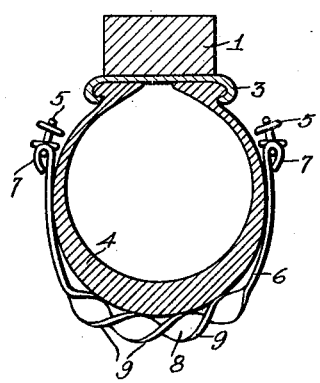
WITNESSES
E. A. Wilson
F. J. Foster
INVENTOR
V. KUBELKA
BY Munn & Co
ATTORNEYS

UNITED STATES PATENT OFFICE.

VRATISLAV KUBELKA, OF BROOKLYN, NEW YORK.

ANTISKID DEVICE.

1,383,823.   Specification of Letters Patent.   Patented July 5, 1921.

Application filed February 12, 1921. Serial No. 444,427.

*To all whom it may concern:*

Be it known that I, VRATISLAV KUBELKA, a citizen of the United States, and a resident of the city of New York, borough of Brooklyn, in the county of Kings and State of New York, have invented a new and Improved Anti-Skid Device, of which the following is a full, clear, and exact description.

This invention relates to improvements in anti-skid devices, particularly to that form of anti-skid device commonly known as a tire chain, an object of the invention being to provide a novel form of tread member associated with a pair of annular chains.

A still further object is to provide a device of the character stated, which will be simple and practical in construction, strong, durable and efficient in use, and a device which may be quickly applied to or removed from a tire.

With these and other objects in view, the invention consists in certain novel features of construction and combinations and arrangements of parts, to be more fully hereinafter described and pointed out in the claim.

In the accompanying drawings:

Figure 1 is a fragmentary view in side elevation of a wheel felly, rim and tire, illustrating my improved anti-skid device in applied position;

Fig. 2 is a view in transverse section on the line 2—2 of Fig. 1;

Referring in detail to Figs. 1, 2 and 3 of the drawings, 1 represents the felly of a wheel 2. A conventional form of clencher rim 3 supports a tire shoe 4. 5, 5 represent a pair of annular chains which encircle opposite sides of the tire shoe 4.

The chains 5 are connected by U-shaped tread members 6. The ends of the members 6 are formed with integral eyes 7 engageable with the links of the chains 5 and the invention in this application resides mainly in the particular conformation of the tread members.

These tread members 6 are formed of hardened steel and their intermediate portions are twisted as indicated at 8, in order to provide a plurality of spiral ground engaging surfaces such as 9, which will dig into a muddy road, or into snow and assist in propelling the car.

It might be noted that the tread members 6 are located relatively close together, in order to obviate the bumping and jarring common to most tire chains and caused by placing the tread members at too great a distance apart. With my improved device, one tread member is always in engagement with the road.

Various slight changes and alterations might be made in the general form and arrangement of the parts described without departing from my invention and hence I do not limit myself to the precise details set forth, but shall consider myself at liberty to make such slight changes and alterations as fairly fall within the spirit and scope of the appended claim.

I claim:

In an anti-skid device, a pair of annular chains adapted to encircle opposite sides of a tire, a plurality of U-shaped members extending transversely of the tire shoe and having their ends connected to the chains, said members located in direct contact with the tire shoe and comprising strips of hardened twisted steel.

VRATISLAV KUBELKA.